United States Patent
Mogul et al.

(10) Patent No.: US 6,243,761 B1
(45) Date of Patent: Jun. 5, 2001

(54) METHOD FOR DYNAMICALLY ADJUSTING MULTIMEDIA CONTENT OF A WEB PAGE BY A SERVER IN ACCORDANCE TO NETWORK PATH CHARACTERISTICS BETWEEN CLIENT AND SERVER

(75) Inventors: Jeffrey C. Mogul, Menlo Park; Lawrence S. Brakmo, Cupertino, both of CA (US)

(73) Assignee: Digital Equipment Corporation, Maynard, MA (US)

( * ) Notice: Subject to any disclaimer, the term of this patent is extended or adjusted under 35 U.S.C. 154(b) by 0 days.

(21) Appl. No.: 09/048,652

(22) Filed: Mar. 26, 1998

(51) Int. Cl.$^7$ ....................................... G06F 15/16
(52) U.S. Cl. .......................... 709/246; 709/217; 709/219
(58) Field of Search ................................. 709/204, 232, 709/234, 235, 246, 219, 203, 217; 345/428; 710/33

(56) References Cited

U.S. PATENT DOCUMENTS

| | | | |
|---|---|---|---|
| 5,764,235 | * 6/1998 | Hunt et al. | 345/428 |
| 5,832,300 | * 11/1998 | Lowthert | 710/33 |
| 5,983,263 | * 11/1999 | Rothrock et al. | 709/204 |
| 6,038,598 | * 3/2000 | Danneels | 709/219 |
| 6,101,328 | * 8/2000 | Bakshi et al. | 709/203 |

OTHER PUBLICATIONS

Seshan et al., "SPAND: Shared Passive Network Performance Discovery," USENIX Symposium on Internet Technologies and Systems, Dec. 8–11, 1997.

* cited by examiner

Primary Examiner—Le Hien Luu
(74) Attorney, Agent, or Firm—Pennie & Edmonds LLP

(57) ABSTRACT

A computer implemented method adjusts a Web page including multimedia content according to the effective bandwidth and/or latency monitored on a network path connecting a server computer storing the Web page, and a client computer requesting the Web page. In response to receiving a request for the Web page in the server computer from the client computer, the server computer, or some other computer closely connected to the server computer monitors the effective bandwidth and/or latency of the network path. Using the measured effective bandwidth and/or latency, the content of the Web page is dynamically adjusted by the server computer while sending the Web page to the client.

39 Claims, 2 Drawing Sheets

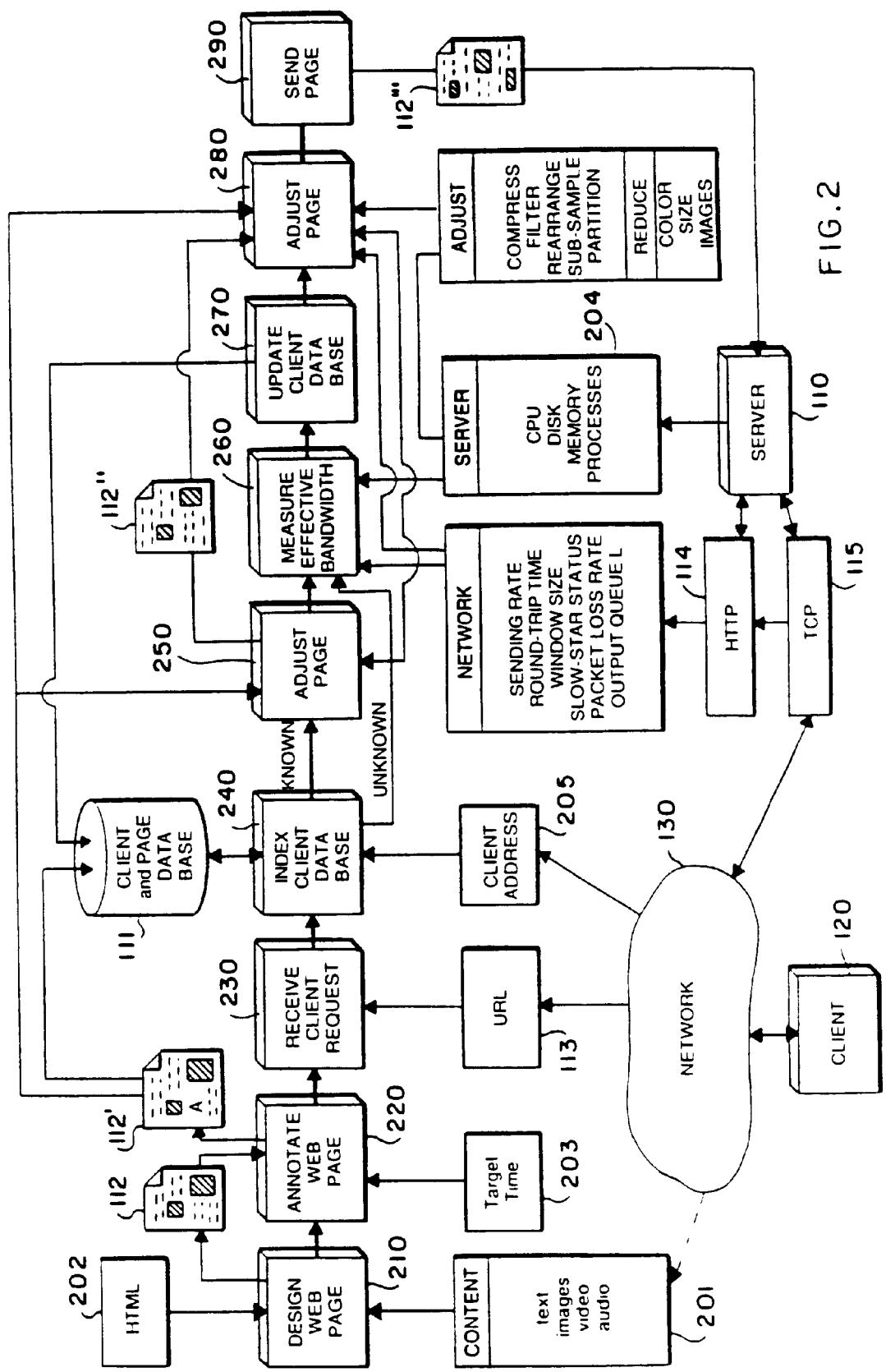

METHOD FOR DYNAMICALLY ADJUSTING MULTIMEDIA CONTENT OF A WEB PAGE BY A SERVER IN ACCORDANCE TO NETWORK PATH CHARACTERISTICS BETWEEN CLIENT AND SERVER

FIELD OF THE INVENTION

This invention relates to communicating Web pages over the Internet, and more particularly to adjusting the content of Web pages at their sources so that the pages can be optimally rendered at destinations depending on effective network conditions.

BACKGROUND OF THE INVENTION

The Internet is a wide area network that connects computer systems of local area networks and intranets all over the world. Some of the systems can generally be classified as server computers and client computers. The clients are mostly operated by end-users, and the servers provide various types of network services to the clients.

One type of service sourced by server computers are Web pages. Web pages are multimedia document that can include textual, graphic, video, and audio content. Most Web pages are generated using the HyperText Mark-up Language (HTML), although the pages can include data encoded according to other formats, e.g., MPEG, JPEG, GIF, and so forth. The Web pages can be simple, that is, only black and white text, or the pages can be ornate with color, video, and synchronous audio, etc.

The most common way to access a Web page is by using a Web browser, for example, the Netscape Navigator™, the Microsoft Internet Explorer™, or through some Internet service such as AOL. The Web pages are located by specifying their addresses. A Web page address is indicated by a Universal Resource Locator (URL). The URL can either be specified directly, or by "clicking" on a "hot-link" in a previously retrieved page.

Typically, the pages are transferred from the servers to the clients using the HyperText Transfer Protocol (HTTP). HTTP is an application level protocol that is layered on top of the Internet protocol. In a TCP implementation, the Internet protocol is defined by the layers of the TCP/IP "stack."

Both in the Internet and in the intranets, the "effective" bandwidths of communication paths between servers and clients can vary greatly. The effective bandwidth depends on transmission rates, number of "hops," error rates, latencies, and so forth. Since servers and clients can be connected via a wide range of network technologies, the effective bandwidth can span at least six orders of magnitude. This means that a Web page that includes both text and graphic images designed for a high bandwidth path will be inappropriate for use by client computers connecting to servers over paths with much lower bandwidths.

It is possible to manually design a simplified Web page for use by clients using low capacity communication paths, but these pages would be boring for users of clients connected via high bandwidth paths. For example, a content rich Web page can include a "hot link" to a less ornate "mirrored" page. The user can then decide, depending on the bandwidth of the network connection, which page to view. However, this requires the user to make an all-or-nothing decision. The user either sees a boring page, or a very complex one, rather than a page that is automatically optimized to whatever the effective available bandwidth is.

In the prior art several methods are known for statically adjusting the content of Web pages. The Netscape Navigator™ browser supports a special feature called the "lowsrc" tag. The "lowsrc" tag allows an HTML-coded Web page to specify the use of two separate codings for a given image. The browser initially loads a low-resolution version of the image, then automatically loads a high resolution version to replace the low-resolution image. This means a low-resolution image is produced fairly quickly, assuming that the user doesn't stop the download or shift to another page. If the user waits long enough, then the high- resolution image is generated, as stated in "http://www.netscape.com/assist/net_sites/impact_docs/creating-high-impact-docs.html", by utilizing the LOWSRC extension that is part of IMG. Netscape Navigator will load the image called "lowres.jpg" on its first layout pass through the document. Then, when the document and all of its images are fully loaded, Netscape Navigator will do a second pass through and load the image called "highres.gif" in place. This means that you can have a very low-resolution version of an image loaded initially; if the user stays on the page after the initial layout phase, a higher-resolution (and presumably bigger) version of the same image can "fade in" and replace it.

Using the "lowsrc" tag does not automatically avoid the time required to load a high-resolution image. In fact, it increases the time because the client must first load a low-resolution image that is subsequently overwritten. Also, this method has no way to adapt other aspects of the page, or to adapt to the page to anything other than either a low bandwidth path or a high bandwidth path.

In another method, as stated in "http://hawk.fab2.albany.edu/delong/shadow/shadow.htm," wherein a low resolution file is displayed initially, then the high-resolution file is gradually painted over the top of it enabling users on slow connections to see the basic image quickly, or wait and see the full image, the Netscape™ "lowsrc" tag is combined with a "shadow" page. The user can interrupt the down-loading of a "pure" page to switch to down-loading the shadow page. This is only a minor improvement of the original Netscape™ "lowsrc" tag, and generally requires an educated and somewhat agile user.

In another method, a proxy server is used. A proxy server is a relay computer system that is located somewhere on the network path between the server and client computers. Normally, proxy computers have high bandwidth connections to servers and low bandwidth connections to clients. The proxy converts high-resolution images to low-resolution images while the Web page is relayed from a server to a client computer. Because the low bandwidth path is the one between the proxy and the ultimate client, this can improve performance.

However, this method is not automatic. The user must explicitly notify the proxy whether to receive a low or high resolution image. Presumably, the user bases this decision on past experience. In addition, the method applies to intermediate systems in the Web rather than directly to the sources of the content, i.e., a server. Consequently, any transformation cannot be based on a semantic understanding of the content. That is, the method does not provide an optimal choice of source material, but only a simplistic degradation of the content. Furthermore, the benefits of the method are lost when the bandwidth of the network path between a server and the proxy is low or variable.

None of the above methods use information about network characteristics, such as bandwidth, error rates, and latencies, to make automatic coding or content decisions at the source, they all depend on some explicit user input.

Steven McCanne in his Ph.D. dissertation (McCanne, S., Scalable Compression and Transmission of Internet Multicast Video, Ph.D. thesis, University of California Berkeley, UCB/CSD-96-928, December 1996 addresses the problem of adapting real-time video transmissions in a multicast network. Multicast is a totally different environment than the point-to-point connections of the World Wide Web. The "Related Work" section of McCanne's dissertation describes a number of previous approaches to the problem of real-time adjustment of audio and video transmissions to variable network conditions.

While some of the prior art methods use some information about network conditions, such as measured bandwidth, queue lengths, or packet loss rates to adjust the nature of a real-time data stream, none of those methods contemplate adjusting the content at the source.

Mogul et al., in "Potential benefits of delta encoding and data compression for HTTP," in Proc. SIGCOMM '97 Conference, pages 181–194, ACM SIGCOMM, Cannes, France, September, 1997, discuss the notion that a Web server can choose to compress certain Web data based on bandwidth. However changing the method of transmission of data (compressed or uncompressed) does not change the actual content received at the destination end depending on actual network conditions.

In another paper by Mogul, "Operating Systems Support for Busy Internet Servers," Proc. Fifth Workshop on Hot Topics in Operating Systems (HotOS-V), pages addendum, IEEE TCOS, Orcas Island, Wash., May, 1995, the notion is discussed that a server can include a "hint" in a Web page sent to a client only when the bandwidth is sufficient. The hint can be useful-but-not-necessary meta-information.

More recent prior art is disclosed by Seshan et al. In "SPAND: Shared Passive Network Performance Discovery," Proc. USENIX Symposium on Internet Technologies and Systems, Monterey, Calif., December, 1997, pages 135–146.

In SPAND, a group of geographically co-located client computers measure the cost of retrieving information from remote servers. The cost measurements are reported to a shared database local to the clients. When one of the clients next decides to retrieve something from a remote server, a query is made of the shared database to obtain an estimate of the cost of retrieval. The client uses the information in the database to adjust its retrieval request. The SPAND system can also use a passive network monitor, co-located with the group of clients, to make network performance observations and update the local database.

With SPAND there is no automatic adaptation to network conditions, and SPAND does not envision a choice of source material. In SPAND, all decisions are made at the client. Clients are usually not aware of the full range of available source material at a server, and usually do not have full control over the generation of the source material, as a consequence, SPAND has minimal ability to adapt the source material. In addition, SPAND requires at least one client in a group to make at least one full retrieval before any predictions about network bandwidths can be made.

In addition, SPAND requires a shared database, local to each group of clients. This shared database is problematic for a number of reasons. The shared database requires installation and administration. The clients have to be configured to access the database. The need to contact the shared database increases network costs and latencies experienced by the clients. It is unclear whether the shared database server will scale up to a large numbers of clients, and whether it would represent a potential availability problem.

SUMMARY OF THE INVENTION

The invention provides a computer implemented method for automatically adjusting the content of Web pages stored by a server computer connected to a client computer by a network path depending on the effective bandwidth on the network path. The Web pages include multimedia content for example, text, images, video and audio. As an advantage the adjusting is performed without the intervention of the user or the client computer. In addition, the adjusting is done dynamically as the effective bandwidth varies over time while the adjusted page is sent to the client computer. It may be useful to use information about the latency (delay) over the network path, in addition to information about the effective bandwidth.

A request for the Web page is received in the server computer from the client computer over the network path. In response, the client computer, or a computer closely connected to the server computer monitors the effective bandwidth on the path. The monitoring can be done by a TCP network layer of the client that forwards the effective bandwidth to an HTTP application layer that adjusts the Web page. As a consequence, the adjusted page is optimally sent to the client in a reasonable amount of time.

In one aspect of the invention, the monitoring and adjusting steps are dynamically performed by the server while the server is sending the Web page to the client.

The monitoring can measure the sending rate, the round-trip time, the packet loss rate on the network path and the server load, including CPU, disk, and memory utilization. In addition, the adjusting can take into consideration annotations made to the Web page, such as a target time to down-load the Web page.

The effective bandwidth of the network path along with a network address of the client computer can be stored in a database of the server for future use. For example, the server can retrieve this information on a subsequent access by a client having the identical, or almost the same network address.

If the Web page includes graphic images, then the adjusting can include reducing the size of the graphic image, reducing the resolution of the graphic image, reducing the number of colors of the graphic image, and reducing the spatial frequencies of the graphic image. In addition, if the page includes a plurality of graphic images, the order in which the graphic images are sent to the client computer can be rearranged. If the page includes audio data, then the audio can be compressed, or sampled at a lower rate. If the page includes video data, then the page can be adjusted by reducing the frame rate. Large pages can be partitioned into multiple connected sub-pages. For example, the sub-pages can be connected in series, as a hierarchy, or a mesh.

BRIEF DESCRIPTION OF THE DRAWINGS

FIG. 2 is a flow diagram of a preferred embodiment of the invention.

DETAILED DESCRIPTION OF THE PREFERRED EMBODIMENTS

Figure 1:
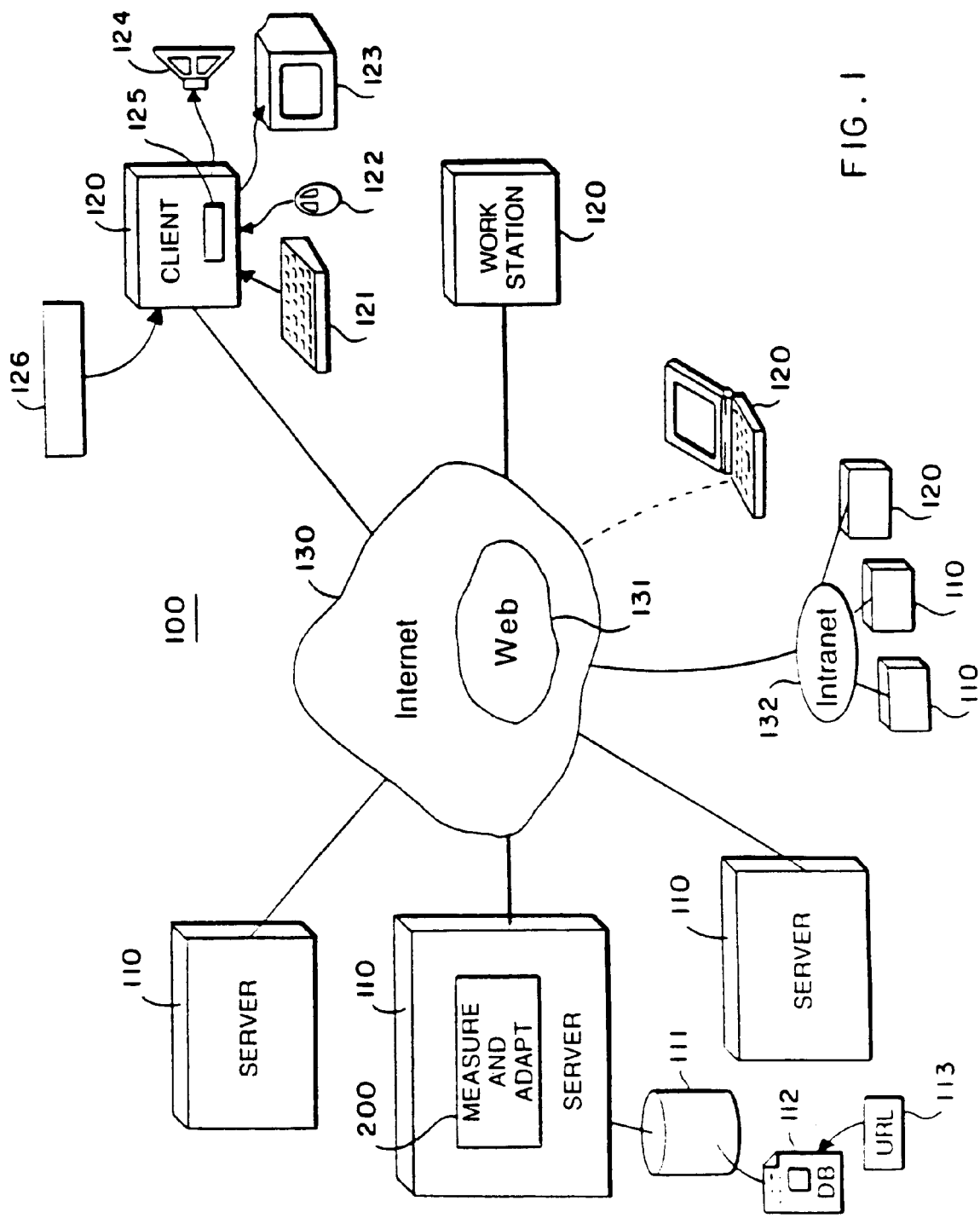
FIG. 1 is a block diagram of network that uses the present invention for automatically adjusting the content and presentation of Web pages to network conditions.

FIG. 1 shows an arrangement 100 that can use the present invention. The invention provides a computer-implemented method that dynamically adjusts the content and presentation of data to actual network conditions. As shown in FIG.

1, a wide area network includes server computers (servers) 110 connected to client computers (clients) 120 by the Internet 130. Some of the servers 110 and clients 120 can be connected by local area networks (intranets) 132.

The servers 110 are usually larger computer systems that provide numerous Internet services available to the clients 120. For example, a server can maintain a database (DB) 111 that stores Web pages 112. The pages 112 essentially are content rich data files that encode multimedia information in various formats. For example, the information can be plain text, colored graphic images, moving video, and audio. Typically, the Web pages 112 are designed using the Hyper-Text Mark-up Language (HTML). With HTML, any number of multimedia data files can be specified as inserts for a particular Web page. The "location" of a Web page or insert thereof is specified by an address called a Universal Resource Locator (URL) 113.

The clients 120 can be any type of computer, personal computers, workstations, and portable devices, such as a laptop or personal digital assistant (PDA), and the like. Typically, a client 120 includes input and output (I/O) hardware devices, for example, a keyboard 121, a mouse 122, a monitor 123, and a loudspeaker 124. The different ways that the clients 120 can be configured is too numerous to detail here.

Clients typically access Web pages by using a "browser" 125, such as the Netscape Navigator™ or the Microsoft Internet Explorer™. The user can specify the URL 113 of a source page to fetch, or pages can be down-loaded by "clicking" on a "hot-link" of a previously retrieved page with the mouse 122.

The Internet 130 is a continuously changing communication environment that connects servers and clients all over the world using the Internet Protocol (IP). In the servers and clients, the protocol is defined by the TCP/IP stack, hereinafter the "network" layer. The Internet includes an application level Hyper-Text Transfer Protocol (HTTP) for transferring Web pages, hereinafter, the "application" layer.

As stated above, the effective bandwidths on the communication paths that connect the servers to the clients can span at least six orders of magnitude. This means that a Web page that includes both text and graphic images designed for a high bandwidth path will be inappropriate for use by client computers connecting over paths with much lower bandwidths.

The invention allows a Web site, e.g., a server, to automatically adjust the content and presentation of Web pages to the currently available bandwidth of the communication path between server and client. When the client and server are connected over a reliable, high-bandwidth path, the server provides highly elaborate content, without concern for transfer time. When the client and server are connected over a slow path, the server provides the necessary content without ornamentation. At intermediate bandwidths and latencies, the server appropriately adjusts the presentation of the content to suit the bandwidth.

For example, if a Web page contains a graphic image, and the server and the client are connected over a high-bandwidth path, then the server generates a large, high-resolution, full-color version of the image to the client. Over a moderate-speed path, the server provides an image that is smaller, a low resolution image, or only in black and white image. Over a very slow path, the server can suppress the images, or perhaps substitute a very small "thumbnail sketch" and the user can decide whether to take the time to retrieve the elaborate image.

More concretely, all recent high-quality implementations of TCP, e.g., "TCP Reno," infer information about the network path between a server and a client. For example, the quality implementations can measure how much time it takes to send a packet across the path (i.e., the latency of the path), how much congestion packets are experiencing, and in some implementations, how much bandwidth is available. This might require a mechanism that allows the server to inquire about network output queue lengths, round-trip times, or estimated bandwidths.

These quantities tend to vary as the situation on the network changes over time. For example, the number of other connections using portions of the same path may change, thus changing the availability of bandwidth to the current connection. The topology of the network might change, forcing packets to take a slower path, e.g., more "hops" though network routers and gateways. Or, the client can be a portable device using a wireless link. In the later case, the bandwidth of the wireless link often changes as the client moves around.

Although extant TCP implementations maintain some or all of this network information, the information is usually not revealed to the next layer in the network protocol stack: in this case, the HTTP application layer. The invention modifies the programming interface between the TCP implementation and the HTTP implementation so that the information maintained by the network layer of the server is revealed to the application layer.

The information revealed to the HTTP application layer can include the following: the server's actual sending rate experienced for a particular client; the round-trip time for client requests, and server responses, and its variance; the receiver's window size; the congestion window size, and its variance; the slow-start status, for example, is the TCP server in a "slow-start" phase, and making a determination of the "slow-start" threshold. The revealed information can also include the packet loss rate, and the time between acknowledgment arrivals for data packets that were sent immediately after one and another.

The server can also measure actual levels of resource utilization, for example, server CPU throughput, disk and memory loading, the depth of the queue that stores unserviced requests, and server network interface utilization. Other similar measures can be derived from the server's internal TCP state, or measurements it collects. In a practical application, not all of this information to make the necessary adjustments.

Because network path characteristics change dynamically, a TCP implementation can never exactly predict future bandwidth availability. However, in practice there is usually a strong correlation between recently experienced bandwidth and bandwidth available in the near future. Similarly, there is usually a strong correlation between recently experienced latency and the latency that will be observed in the future. In addition, extant TCP implementation only maintain the information as long as the connection between the server and client is in place, prior art TCP implementations generally discards this information after the connection is broken.

The invention preserves the information in the database 111 over multiple connections, in other words, the invention is not constrained to predict future bandwidth based only on past bandwidth observations for the current connection; the invention can also use observations from previous connections to the same client, or even to clients that are "close" to each other.

Alternatively, the information can be collected by software system separate from the software that implements the TCP stack. The software can passively monitor the network packets to and from the server. The packets can be analyzed to reveal information to predict network bandwidth and latency.

Collecting the network information by passive monitoring, instead of by a modified TCP implementation, can consume additional CPU resources. However, passive monitoring can be used with network protocols other than TCP, and avoids the need to modify a server's operating system software. The connection that is used to exchange network information between the HTTP server and the passive monitor can be a low bandwidth connection.

The passive monitor for a substantial sized Web server can be implemented on a moderately powerful workstation-class computer. Even if the passive monitor were to miss a few packets during conditions of high load, as passive monitors sometimes do, the consequences would be a minor degradation in its predictions of future bandwidth, but this would not affect the correct behavior of the HTTP server.

With the network information collected either actively or passively as described above, the HTTP Web server, can predict, to a high degree of certainty, the likely available bandwidth to a particular client. Thus, a source Web page having any type of content can now be adjusted to whatever bandwidth is available. If the designer of a Web page has provided sufficient information in advance, the HTTP can automatically select, at the time it provides a response to the client, the most appropriate format of the Web page.

For example, if a particular Web page includes graphic images, and the network connection between the server and the client has a low bandwidth, then the HTTP server can convert some or all of the images on the page to a lower-resolution form, e.g., fewer pixels, smaller size, a reduced field of view, fewer colors. In addition, the server can apply a filtering function to the images to reduce high spatial frequencies, and so forth. In the case where the path has a very low bandwidth, the server can eliminate some images entirely, and links can be substituted for the eliminated images so that the user can still request the images explicitly.

To facilitate the adjustment according to the invention, the Web page can be enhanced with annotations. These annotations can assist the HTTP server to determine which images are best simplified or eliminated, and which images ought to be preserved, even in very low bandwidth situations. The page can also specify target download time for the images, or for entire pages. The HTTP server can then adjust the correct resolutions and sizes for the images, or eliminate an image to match the target times for a specific bandwidth prediction.

In many cases, however, the HTTP server can make its choices without designer input. The server software can use default values, based on human factors studies of what most users prefer. For example, most users might prefer to wait for no more than sixty seconds for any Web page, unless they specifically request a higher-resolution rendition.

The server might modify the layout of the page, so that the more important images appear first, even though this may cause a less visually pleasing page layout. Or, the server can remove some text from the page. Alternatively, the page can be partitioned into a series, hierarchy, or mesh of interconnected subpages so that a user facing a slow network would only have to look at small views of the entire page.

For data formats that can be compressed, the server can choose whether or not to do compression, or which compression algorithm to use. Some algorithms provide better compression, and hence better use of low-bandwidth paths, but at CPU costs that would be inappropriate for use with high-bandwidth paths.

While this invention is described in terms of text and static images, it is possible to extend the method to cover other kinds of information. For example, most of the transformations (image size, resolution, color, spatial frequency) that apply to static images also apply to video (moving images). For delivering video over a low bandwidth path, the server can adjust the frame rate and certain aspects of the video compression resolution. Alternatively, the server can substitute a stream of cartoons for a stream of photographic images, or substitute a 100×100 pixel video stream for a 512×512 pixel stream.

For audio, the server can apply rate-based adaptive multimedia protocols such as varying the sampling rate, sample resolution, and other aspects of the audio signals. Stereo can be converted to mono, and periods of silence and low amplitude signals, e.g., background music, can be removed entirely leaving only the speech portion.

The method of the invention can be extended to Web pages that include a number of applets, which are programs that are embedded within the Web pages and which execute within the context of a Web browser. According to the method of the invention, the server, for example, can reduce the number of applets that are sent to the client computer, reduce the complexity or optimize the length of such applets, or reduce the amount of data to be presented by such applets to the client. Combinations of these adjustments to applets are possible.

There can still be a problem when the server is connected to the client via a proxy server. In this case, the bandwidth between the server and the proxy is usually much larger than the bandwidth between the proxy and client. In the simplest form of the invention, the HTTP server only senses the bandwidth of the path to the proxy. Thus, even if the ultimate client is connected via a low-bandwidth path, the HTTP server would inappropriately choose a bulky representation for the content being sent.

However, the proxy can just as well determine the bandwidth between itself and the client using the same basic method as described above. The method can be generalized to paths with multiple proxies. After the proxy has made a bandwidth or latency determination, the proxy forwards the information to the server as part of the client's forwarded requests. HTTP allows proxies to add certain kinds of HTTP "header" to forwarded requests or responses. This technique also improves the ability of the proxy to efficiently cache multiple responses for the same URL that use different bandwidth-dependent representations by using an HTTP mechanism known as "Vary header" as described in RFC2068 and subsequent versions of the proposed HTTP/1.1 specification.

The invention is most useful when the bandwidth information is available early on in the interaction between the client and server because the HTTP server needs to decide how to adjust the presentation fairly early on in the process of responding to a client's request. One approach, as noted above, is to remember past history for a specific client, although this will not help for a client that has not previously used the server. Another approach is to use as much information as possible to glean from the client's initial connection "handshake" and HTTP request. This information might be somewhat limited, although the limited information can establish a gross estimate of the available bandwidth.

It is also possible to treat a cluster of clients with similar locations in the network as having similar-bandwidth paths from the server, at least for an initial estimate. Consider two clients X and Y. The server, from previous interactions has a good estimate for the bandwidth to X, and no estimate for the bandwidth to Y. If the server can determine, from their Internet addresses, that X and Y are likely to be located near each other, then the server can reasonably assume, as an initial estimate, that the bandwidth to Y is about the same as the bandwidth to X.

One way to determine "nearness" using Internet addresses is to see how many of the most-significant bits of the address match. For example, two clients at "206.48.61.10" and "206.48.61.34" are probably reachable by almost the same network path. This is essentially the same mechanism used to reduce the complexity of routing tables in the Internet, but in that application the aggregation is done with explicit information, not by inference.

In the context of the present invention, the server can either use Internet routing information that provides explicit aggregation information, or a simple pattern-match on the addresses. However, the explicit information may not always available to the HTTP server. Since neither of these techniques is failure-proof, the server's initial bandwidth estimate based on a "nearness" determination can be superseded by other "early" information about the bandwidth to a specific client, as described above.

FIG. 2 shows the details of one embodiment of the invention. It should be apparent to one of ordinary skill in the art that some of the steps shown can be repeated, and other steps are variations or embellishments of the basic method of the invention, in other words not every step shown is necessary to work the invention.

A Web page 112 is designed (210) from Web content 201 using HTML 202. The page can be annotated (220) with, for example, a target down-load time 203 to aid the adjusting of the content when the page is down-loaded. The annotated page 112' can be stored in the database 111 of the Web server. In response to receiving (230) a request for the page from a client computer, e.g., the URL 113, the server can index (240) the database with the client's address 205 to determine if effective bandwidth information about the network path from the server to the client is known. If so (known), adjustment (250) of the page 112" can proceed immediately.

If the database does not contain the appropriate information (unknown), the server omits the immediate adjustment (250). In either case, the current effective bandwidth (and/or latency) of the network path can be measured (260). The effective bandwidth can be determine by a network layer (TCP) 115 of the server 110 that forwards this information to an application layer (HTTP) 114. The effective bandwidth can also depend on server loads 204. The client database can be updated (270) with current bandwidth information. The measured bandwidth can be used to further adjust (280) the page while the adjusted page 112" is sent (290) to the client.

By automatically varying the layout of a source Web page, in response to recent information about network conditions and therefore in response to predictions about the bandwidth available for a specific page transmission, a Web server including the method of the invention can achieve an appropriate compromise between page complexity and download time.

The main difference between this invention and the known prior art is that the present method is automatically adaptive, applies to Web servers, and involves a choice of source material. Except for SPAND described above, prior approaches that use automatic adaptation do not apply to the Web, and do not envision a choice of source material that is rendered.

It is understood that the above-described embodiments are simply illustrative of the principles of the invention. Various other modifications and changes may be made by those skilled in the art which will embody the principles of the invention and fall within the spirit and scope thereof.

We claim:

1. A computer implemented method for adjusting a Web page stored by a server computer connected to a client computer by a network path, the Web page including multimedia content, the multimedia content including at least two forms of content selected from the group consisting of text, images, audio, video, and software, comprising the steps of:

receiving a request for the Web page in the server computer from the client computer over the network path;

monitoring, in response to receiving the request, a characteristic of the network path between the client computer and the server computer;

adjusting the multimedia content of the Web page according to the monitored characteristics, including dynamically adjusting the multimedia content of the Web page other than image content by the server while the server is sending the Web page to the client computer; and sending the adjusted Web page to the client computer.

2. The method of claim 1 wherein the monitored characteristic includes an effective bandwidth of the network path.

3. The method of claim 1 wherein the monitored characteristic includes a latency of the network path.

4. The method of claim 1 wherein the monitored characteristic includes an effective bandwidth and a latency of the network path.

5. The method of claim 1 wherein the multimedia content is formatted according to HTML.

6. The method of claim 1 wherein the monitoring is passively performed by monitoring software, the monitoring software forwarding the monitored characteristic to the server while the server is adjusting and sending the Web page to the client computer.

7. The method of claim 1 wherein the monitoring is performed by a proxy server, the proxy server forwarding the monitored characteristic to the server while the server is adjusting and sending the Web page to the client computer.

8. The method of claim 1 wherein the monitoring includes measuring a sending rate on the network path.

9. The method of claim 1 wherein the monitoring includes measuring a round-trip time on the network path.

10. The method of claim 1 wherein the monitoring includes measuring a packet loss rate on the network path.

11. The method of claim 1 wherein the monitoring includes measuring a server load of the server, and adjusting the Web page according to the measured server load while sending the Web page to the client computer.

12. The method of claim 1 wherein the server load includes CPU, disk, network and memory utilization.

13. The method of claim 1 wherein the multimedia content of the Web page includes annotations that indicate priority order for specified portions of the Web page, and the method includes sending the client computer the specified portions of the Web page in the indicated priority order to enable fast partial rendering of the Web page at the client computer.

14. The method of claim 13 wherein the annotations include a target time to send the Web page to the client computer; and the method including sending only portions of the Web page that can be transmitted to the client computer within the target time.

15. The method of claim 1 wherein the monitoring of the monitored characteristic is performed by a network layer of the server, the network layer forwarding the monitored characteristic to an application layer of the server, the application layer adjusting the Web page according to the forwarded monitored characteristic.

16. The method of claim 15 wherein the network layer is a TCP implementation, and the application layer is a HTTP implementation.

17. The method of claim 1 including storing the monitored characteristic of the network path with a network address of the client computer in a database of the server computer, and retrieving the monitored characteristic of the network path to the client computer from the database when receiving a subsequent request from a particular client computer having a substantially identical network address as the client computer.

18. The method of claim 1 wherein the Web page includes a graphic image, and the adjusting reduces the size of the graphic image.

19. The method of claim 1 wherein the Web page includes a graphic image, and the adjusting reduces the resolution of the graphic image.

20. The method of claim 1 wherein the Web page includes a graphic image, and the adjusting filters the graphic image.

21. The method of claim 1 wherein the Web page includes a graphic image, and the adjusting reduces the number of colors of the graphic image.

22. The method of claim 1 wherein the Web page includes a graphic image, and the adjusting reduces the spatial frequencies of the graphic image.

23. The method of claim 1 wherein the Web page includes a graphic image, and the adjusting compresses the graphic image.

24. The method of claim 1 wherein the Web page includes a plurality of graphic images and the adjusting reduces the number of graphic images sent to the client computer.

25. The method of claim 1 wherein the Web page includes a plurality of graphic images, and the adjusting rearranges the order in which the graphic images are sent to the client computer to enable fast partial rendering of the Web page at the client computer.

26. The method of claim 1 wherein the Web page includes audio data, and the adjusting compresses the audio data.

27. The method of claim 1 wherein the Web page includes audio data, and the adjusting reduces a sampling rate of the audio data.

28. The method of claim 1 wherein the Web page includes audio data, and the adjusting suppresses background audio data.

29. The method of claim 1 wherein the Web page includes video data, and the adjusting compresses the video data.

30. The method of claim 1 wherein the Web page includes video data, and the adjusting includes reducing the frame rate of the video data.

31. The method of claim 1 wherein the adjusting the Web page includes partitioning the Web page into a plurality of connected sub-pages to enable fast partial rendering of the Web page at the client computer.

32. The method of claim 31 wherein the sub-pages are arranged serially.

33. The method of claim 31 wherein the sub-pages are arranged in a hierarchy.

34. The method of claim 31 wherein the sub-pages are arranged in a mesh.

35. The method of claim 1 wherein the Web page includes text, and the adjusting reduces the amount of text.

36. A computer implemented method for adjusting a Web page stored by a server computer connected to a client computer by a network path, the Web page including software programs executable at the client computer, comprising the steps of:

receiving a request in a server computer from a client computer over a network path for a Web page including at least one software program;

monitoring a characteristic of the network path between the client computer and the server computer;

adjusting the Web page, including dynamically adjusting to reduce complexity the at least one software program by the server while the server is sending the Web page to the client computer, according to the monitored characteristic of the network path; and sending the adjusted Web page to the client computer.

37. The method of claim 36 wherein the adjusting reduces the number of the at least one software program sent to the client computer.

38. The method of claim 36 wherein the adjusting optimizes a length of the at least one software program.

39. The method of claim 36 wherein the at least one software program includes data to be presented to the client computer, and the adjusting reduces a length of the data.

* * * * *